United States Patent [19]

Oury

[11] Patent Number: 4,846,580

[45] Date of Patent: Jul. 11, 1989

[54] LARGE SCALE CONCRETE CONVEYANCE TECHNIQUES

[75] Inventor: Robert F. Oury, Gilberts, Ill.

[73] Assignee: Rotec Industries, Inc., Elmhurst, Ill.

[21] Appl. No.: 28,346

[22] Filed: Mar. 20, 1987

[51] Int. Cl.⁴ ........................ B28C 7/06; B65G 41/00; E02B 3/00

[52] U.S. Cl. ........................................ 366/27; 366/37; 366/40; 366/49; 366/59; 198/860.5; 198/861.1; 248/295.1; 248/296; 248/357; 405/107

[58] Field of Search ....................... 366/1, 27, 2, 30, 4, 366/33, 6, 34, 7, 42, 8, 49, 10, 53, 11, 26, 16, 59, 26, 28, 29, 35, 37, 40, 43, 54, 56, 64, 134, 135, 152, 160, 181, 186, 189; 248/295.1, 296, 357, 679; 198/861.4, 861.5, 317, 316.1, 318, 860.1, 861.1; 405/107, 109

[56] References Cited

U.S. PATENT DOCUMENTS

| | | | |
|---|---|---|---|
| 624,571 | 5/1899 | Strifler | 248/296 |
| 685,011 | 10/1901 | Tell | 248/357 |
| 1,038,698 | 9/1912 | Whitney et al. | 366/20 |
| 1,255,750 | 2/1918 | Humphrey | 366/49 |
| 1,607,713 | 11/1926 | Wickey | 366/27 |
| 2,739,797 | 3/1956 | Komper | 366/27 |
| 2,880,976 | 4/1959 | True | 366/11 |
| 3,108,448 | 10/1963 | Hightower | 366/7 |
| 3,306,589 | 2/1967 | Uden | 366/16 |
| 3,333,807 | 8/1967 | Locatelli | 248/295.1 |
| 3,667,736 | 6/1972 | Carroll | 366/27 |
| 3,705,710 | 12/1972 | Mueller | 366/11 |
| 3,767,031 | 10/1973 | Gorgei et al. | 198/861.1 |
| 3,835,982 | 9/1974 | Zappia | 198/861.1 |
| 3,866,889 | 2/1975 | Maxon | 366/27 |
| 3,912,238 | 10/1975 | Richard | 366/10 |
| 4,164,597 | 8/1979 | Smith | 366/186 |
| 4,261,460 | 4/1981 | Peterson | 198/861.1 |
| 4,475,648 | 10/1984 | Weeks | 198/860.1 |

FOREIGN PATENT DOCUMENTS

| | | | |
|---|---|---|---|
| 2321208 | 11/1973 | Fed. Rep. of Germany | 366/30 |
| 3113060 | 3/1982 | Fed. Rep. of Germany | 366/49 |
| 78010 | 5/1985 | Japan | 405/107 |
| 102409 | 6/1985 | Japan | 405/107 |
| 742151 | 7/1980 | U.S.S.R. | 366/27 |
| 1167255 | 7/1985 | U.S.S.R. | 405/107 |
| 762491 | 11/1956 | United Kingdom | 198/861.1 |
| 839600 | 6/1960 | United Kingdom | 248/357 |

OTHER PUBLICATIONS

Title: "Construction Ingenuity Displayed at Diablo Dam", Publication: Engineering News-Record; date: Aug. 29, 1929, pp. 320–324.

Title: Grouted Gravel Fill and Precast Slobs Provide New Face for Barter Dam; Author: Davis et al.; Date: 2-1948, pp. 26–31; Publication: Civil Engineering.

Title: Three Types of Design Uses in California Flood Control Dam; Pub. Engineering News Record; date: 7/9/31; pp. 46–49; Author: Wadworth et al.

Title: Million Yards of Concrete Placed at Record Rate; Pub. Engineering News Record; date: 12/21/33; pp. 743–750.

Title: Ribbon Batch and Conveyor Placing System for Concrete Dams; Author: Robert Oury; paper from the Asilomer Dam Conference of 1970, pp. 281–295.

*Primary Examiner*—Harvey C. Hornsby
*Assistant Examiner*—Joseph S. Machuga
*Attorney, Agent, or Firm*—Allegretti & Witcoff, Ltd.

[57] ABSTRACT

The disclosure describes a method and apparatus for continuous mixing, transporting and placing of large quantities of concrete in which aggregate transported on a belt conveyor is mixed with metered quantities of cement and water adjacent a place of pouring. Alternatively, mixed concrete is transported to a place of pouring protected from the elements on a belt conveyor covered by a tunnel that confines cooled air.

4 Claims, 8 Drawing Sheets

Fig. 4
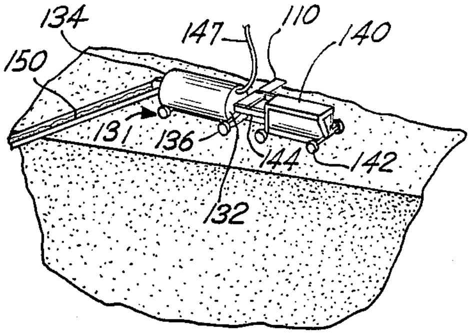
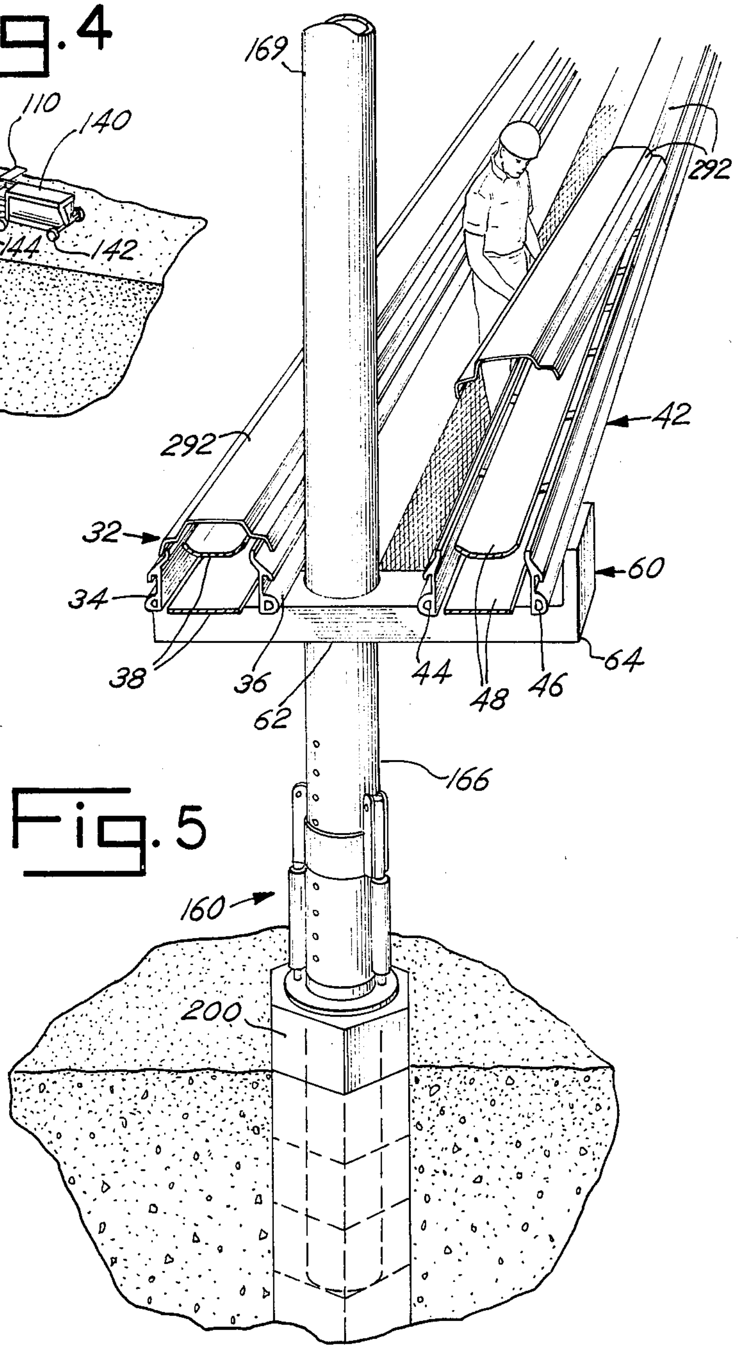
Fig. 5

LARGE SCALE CONCRETE CONVEYANCE TECHNIQUES

BACKGROUND OF THE INVENTION

1. Field of the Invention

This invention relates to techniques for the continuous mixing, transporting and placing of large quantities of concrete as, for example, in building a dam.

2. Description of the Related Art

Concrete dams, for many years, have been built by mixing the various ingredients (aggregate, sand, Portland cement and water) in a mixing plant and transporting the concrete by rail cars to a cableway stretched across the dam. The concrete is carried in large buckets suspended from trucks which roll on the cable. The buckets are lowered into a serise of pours, called blocks, where the concrete is dumped from the bucket. By this procedure, pour rates as high as 200 $yd^3$/hr are achieved, but typically the rate is about 100 $yd^3$/hr. The cableways are disadvantageous because they sway in high winds and variably sag, depending upon how far the bucket is spaced from the edge of the canyon. They are, therefore, difficult to control.

Alternatively, at some dam sites, the mixed concrete has been transported to the dam site by trucks, dumped, and distributed by bulldozer.

It has been proposed previously in U.S. Pat. No. 3,845,631 (Malan) to build a dam by forming a pool upstream of the pool, and discharging the concrete from the mixing plant into the dam. All ingredients for the concrete are supplied to the mixing plant on floating conveyors. The pool is permitted to deepen as the dam rises, so that the mixing plant rises with the dam.

SUMMARY OF THE INVENTION

The object of the present invention is to accurately distribute mixed concrete continuously at a rate of about 1,300 $yd^3$/hr. at a construction site. The invention places the concrete in large volume compared to conventional pouring methods, and permits continuous pouring from the beginning to the end of the construction.

In order to achieve these objectives, a number of problems need to be overcome. A large construction site, such as a dam, may require a string of conveyors a mile long. During transportation over such a long distance, the concrete may begin to set up, and during warm weather, evaporation of water from the concrete will be excessive. The concrete must be delivered rapidly enough to prevent a "cold joint" between adjacent blocks or pours. In case of a conveyor breakdown, the concrete may harden on the conveyor and completely freeze up the apparatus. A long conveyor on which concrete has hardened requires weeks to repair. For this reason, it has never been considered practical to use long conveyors at large construction sites.

In accordance with one aspect of the invention, all of the ingredients of the concrete, except water and Portland cement, are mixed in the proper proportions at a remote mixing site and are transported to the construction site on belt conveyors. In the event of a breakdown, hardening is avoided, even though the sand in the aggregate may contain water, because the active ingredient, cement, is not present. Just before the material goes into placement, cement and water are added in proper proportions in a rotary mixer. The mixed concrete is discharged onto a placement conveyor such as the one shown and described in U.S. Pat. No. 3,598,224 (Oury).

In U.S. Pat. No. 3,779,519, Anderson et al. suggest the conveying of all dry ingredients for concrete, including cement, through a conduit on a stream of air, and subsequently mixing the dry ingredients with water at the point of placement. Such techniques are not suitable for dam construction. Only a very small amount of concrete may be placed by an apparatus of this kind. The conduit is short and concrete will not set up in the conduit.

According to another aspect of the invention, the concrete is mixed at a remote mixing site and is preserved by sun covers and cold air introduced into a tunnel formed along the belt conveyor.

Another object of the invention is to provide a conveyor system capable of delivering concrete rapidly enough to prevent a cold joint.

Yet another object is to provide a conveyor system that prevents contamination of the concrete applied to the construction site by residue from the conveyor belt.

Still another object is to provide a means of distributing the concrete to prevent segregation.

A further object is to provide a conveyor system with sufficient speed to prevent excessive heating of the concrete on the belt.

Yet a further object is to provide a conveyor that will operate under unlevel and unbalanced conditions.

Another object of the invention is to provide a conveyor system capable of distributing six inch aggregate without segregation.

Still a further object of the invention is to provide a conveyor system that is self-elevating.

DESCRIPTION OF THE DRAWINGS

The present invention may be more easily understood by referring to the drawings in which:

FIG. 4 is a side elevational view of a rotary mixing system used in conjunction with the system shown in FIG. 1;

FIG. 5 is a perspective view of a support means for the conveyors shown in FIG. 1 which raise the conveyors;

DESCRIPTION OF THE PREFERRED EMBODIMENTS

Figure 1:
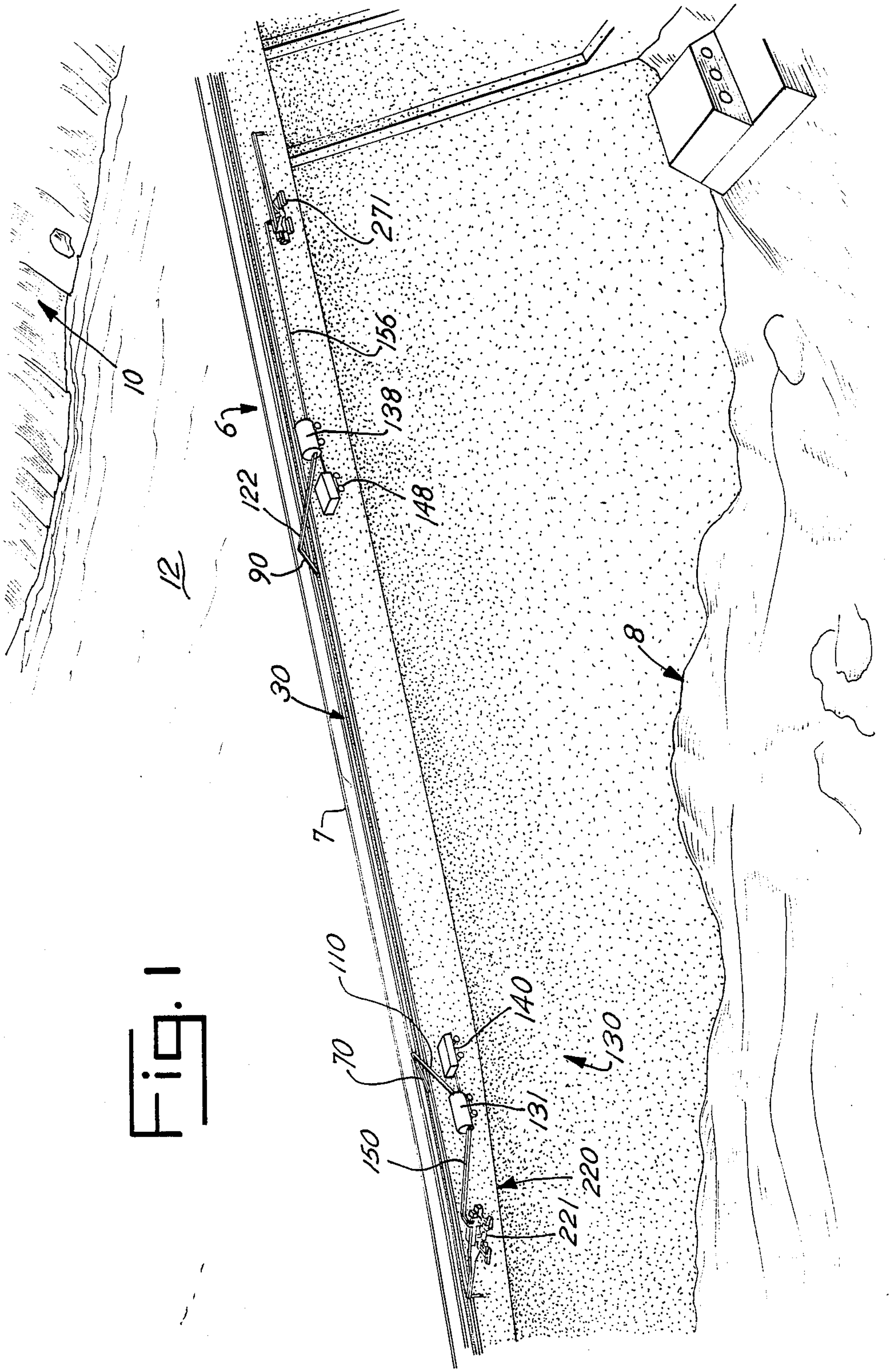
FIG. 1 is a perspective view of a dam shown in conjunction with a preferred form of concrete placing system according to one embodiment of the invention.

A first embodiment of the invention is described in connection with FIGS. 1–8. Referring to those figures, the first embodiment basically comprises a stockpiling system 14, a twin mainline conveyor system 30, traveling belt tripper conveyors 70 and 90, link conveyors 110 and 122, a mixing system 130, a support system 160, and a concrete spreading system 220.

Figure 2:
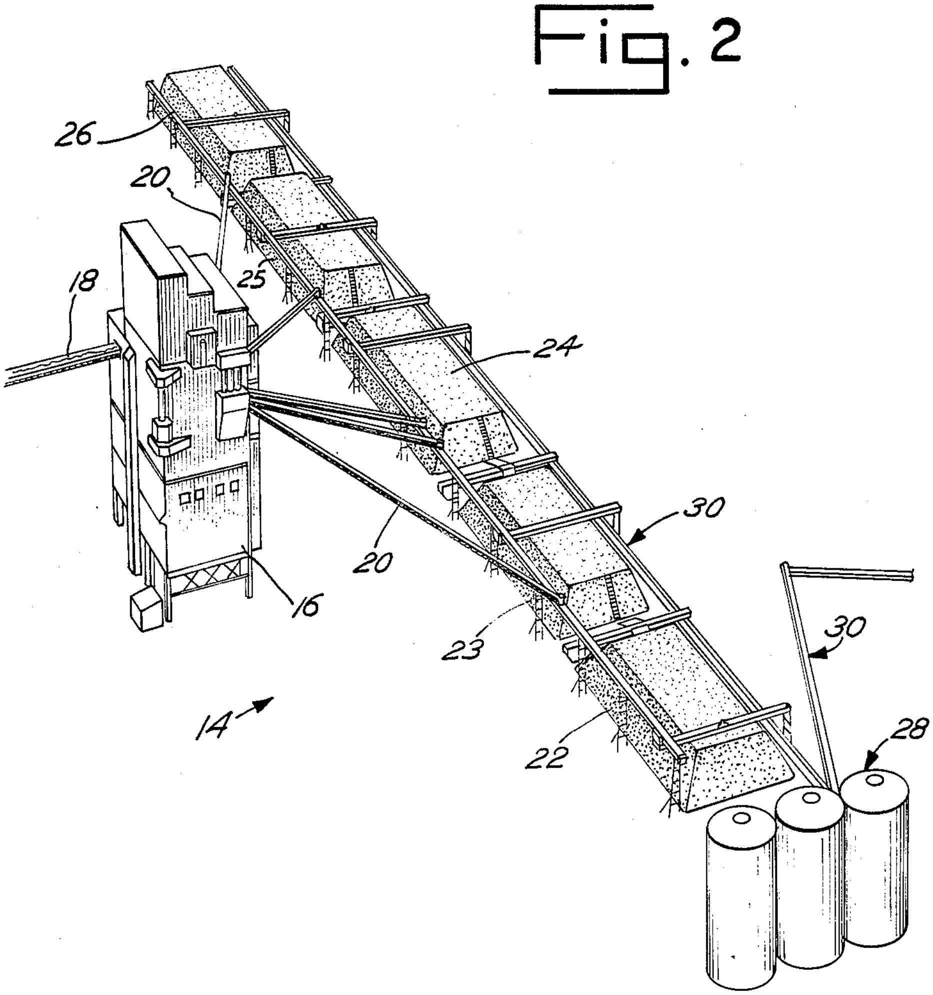
FIG. 2 is a perspective view of a perferred form of stockpiling system according to one embodiment of the invention.

FIG. 1 shows a partially-completed concrete dam 6 located between river banks 8 and 10 to form a lake 12. FIG. 2 illustrates stockpiling system 14 that creates and stores the material used to form dam 6. Stone is fed on a conveyor 18 to a crushing plant 16 that crushes stone into various sizes to provide concrete aggregate. These sizes preferably include sand, as well as threequarter inch, one and one-half inch, three inch and six inch aggregate, each size being stored in a separate one of bins 22–26, respectively. The bins are fed from separate conveyors 20 connected to the crushing plant. The various sizes of aggregate are removed from the bins with self-loading apparatus (not shown) that meters the aggregate and deposits it in predetermined quantities on twin mainline conveyor system 30. Such self-loading apparatus is well-known in the conveying art. As shown in FIG. 2, cement fly ash may be added from silos 28.

As shown in FIGS. 1, 2 and 5, conveyor system 30 comprises a series of substantially identical conveyor sections, each section about fifty feet long. Referring to FIG. 5, an exemplary section of system 30 includes a conveyor 32 having side frames 34 and 36 that support an endless belt 38. The exemplary section also includes a conveyor 42 having side frames 44 and 46 that support an endless belt 48. Conveyors 32 and 42 are held parallel to one another on a main frame 60, including a centerline beam 62, that supports the conveyors on joists 64. The series of twin belt conveyors comprising system 30 are connected to each other in the manner shown in U.S. Pat. No. Re. 26,298 issued to Oury. This is an important feature that enables the conveyors to operate under unlevel and unbalanced conditions normally found on river banks.

As many sections of twin belt conveyors as needed are used to connect stockpiling system 14 to the site of dam 6. For some dams, conveyor system 30 may extend for a mile or more. Each of the belts in the conveyor system 30 may be 36 inches wide and run at a rate of about 900 feet per minute. Under these conditions, about 1,350 cubic yards per hour of aggregate are supplied per belt. This is an important feature that enables concrete to be delivered with sufficient speed to avoid cold joints and excessive heating of the concrete enroute to the dam.

Figure 3:
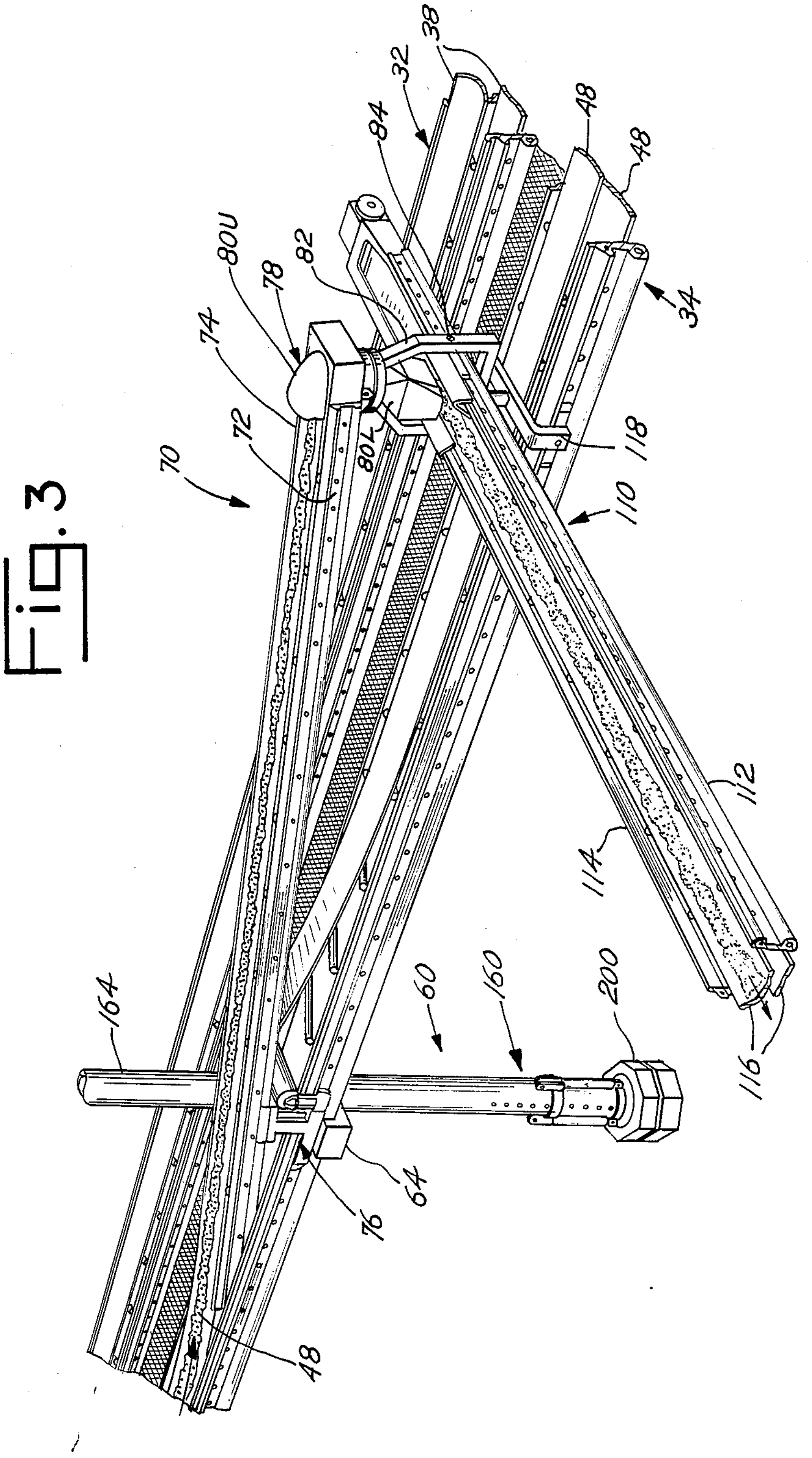
FIG. 3 is a perspective view of a preferred form of tripper conveyor according to one embodiment of the invention.

According to the first embodiment of the invention, means are provided for adding cement and water to the aggregate and thoroughly mixing the mass at a point close to the area at which concrete is being added to the surface of dam 6. This means includes traveling belt tripper conveyors 70 and 90. As shown in FIGS. 1 and 3, tripper conveyor 70 operates in connection with main line conveyor 34, whereas tripper conveyor 90 operates in connection with main line conveyor 32.

Since conveyors 70 and 90 are identical, only conveyor 70 will be described in detail. Referring to FIG. 3, conveyor 70 includes sideframes 72 and 74 that are supported by a movable carriage 76 that can be moved to any location along the length of conveyor 34. Conveyor 70 also includes a swivel transfer 78 that uses an upper baffle 80 U and a lower baffle 80 L in order to prevent rock bounce when six inch aggregate is used. This important feature can be achieved by using the transfer apparatus shown in U.S. Pat. No. 3,171,534 (Oury-Mar. 2, 1965).

As shown in FIG. 3, tripper conveyor 70 deposits concrete on a link conveyor 110. As shown in FIG. 1, an additional link conveyor 122 identical to conveyor 110 is also used at the dam site. Since conveyors 110 and 122 are identical, only conveyor 110 will be described in detail in connection with FIG. 3. Conveyor 110 includes side frames 112 and 114 that support an endless belt 116. Conveyor 110 is rotatable with respect to conveyor 70 and may be moved with respect to conveyor 34 by means of a conventional carriage 118 that moves along conveyor 34 and pivotally mounts a yoke 82. Conveyor 110 pivots on yoke 82 around a pivot axle 84. In a conventional manner, conveyor 110 incorporates a Ramsey belt scale weighing device (not shown) by which the aggregate carried on belt 116 may be accurately weighed. An identical weighing device is used in connection with conveyor 122.

Referring to FIGS. 1 and 4, mixing system 130 comprises identical continuous helical tube mixers 131 and 138. Since the mixers are identical, only mixer 131 will be described in detail in connection with FIG. 4. Mixer 131 has an inlet end 132 and an outlet end 134, and is movably mounted on a four-wheel carriage 136.

Mixer 131 is attached to and movable with a gravity-fed trailer 140 that is mounted on a four-wheel carriage 142. A conventional conveyor 144 enables cement from trailer 140 to be transmitted in metered amounts to tube mixer 131. An identical trailer 148 is used in connection with mixer 138.

In a well-known manner, the self-loading apparatus for the aggegate (not shown) referred to in connection in FIG. 2 includes an electronic recording instrument that records the proportion of the various sizes of aggregate loaded on conveyor system 30. This proportion is transmitted electronically to the tube mixer over wires (not shown). The tube mixer employs a well-known electronic control device for metering the proper amount of water and cement into the tube mixer, depending on the proportion of aggregate and the weight detected by the Ramsey belt scale weighing device used in connection with conveyor 110. Such electronic controls are well-known and have been utilized, for example, in an Erie-Strayer concrete batch mixing plant. Water is obtained from the lake 6 through a hose 147 that is also metered in a well-known manner by the electronic control device. As a result, finished wet concrete is mixed in tube 131 and is deposited on a link conveyor 150 constructed similar to conveyor 110. A similar conveyor 156 is used in connection with tube 138 (FIG. 1).

Referring to FIGS. 3 and 5–7, the portions of conveyors system 30 extending along the dam surface are mounted on support system 60. System 60 comprises a series of jackpost assemblies 162 that permit conveyor 30 to be raised periodically as the dam rises. The jackpost assemblies "ride" the concrete of the dam as it is put in place and provide a means of automatically raising conveyor system 30 so that a crane is not needed. This is an important feature that enables continuous pouring of concrete.

Figure 6:
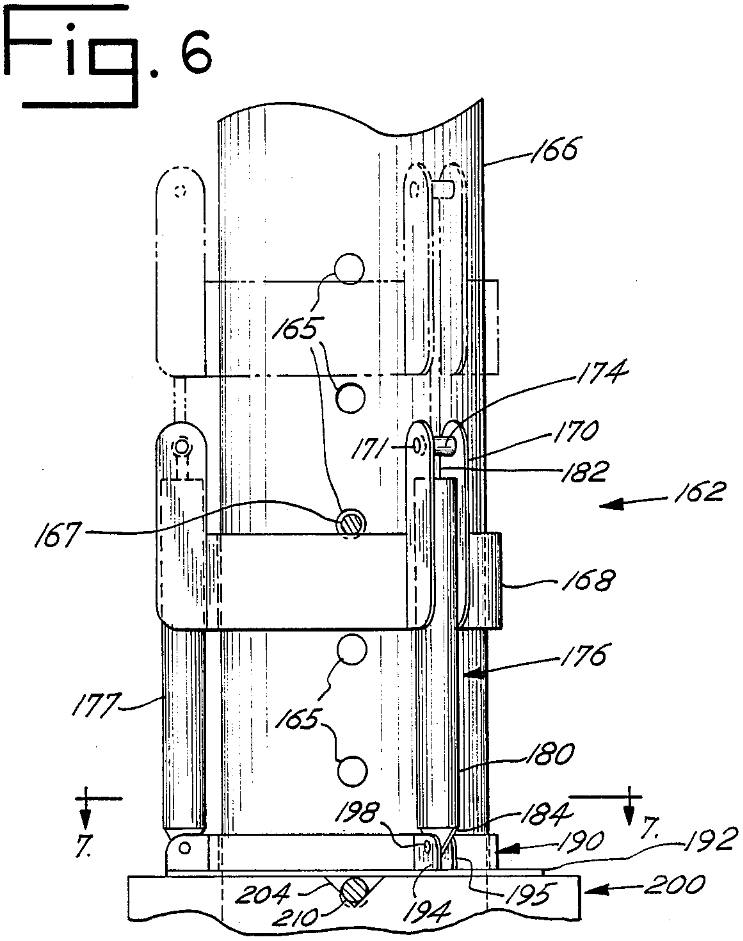
FIG. 6 is a fragmentary, enlarged, side elevational view of the support means shown in FIG. 5.
Figure 7:
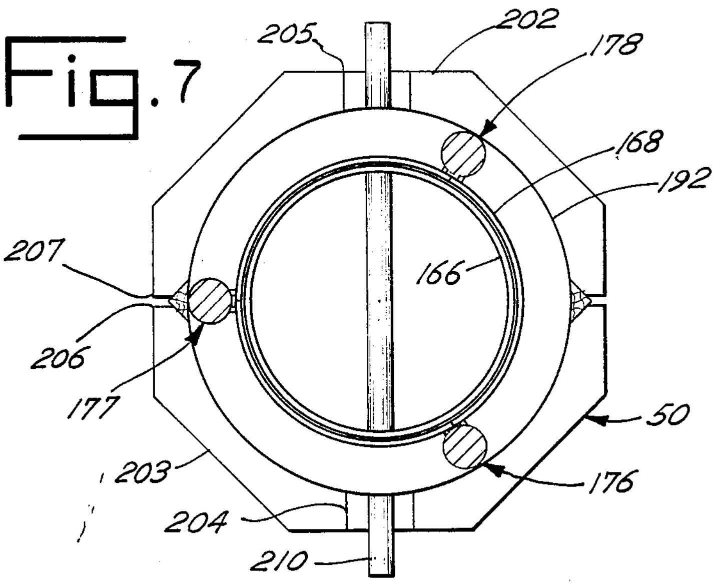
FIG. 7 is a cross-sectional view taken along line 7—7 of FIG. 6.

Referring to FIGS. 6 and 7, a typical jackpost assembly includes a post 166 having a series of opposed equally spaced pairs of holes 165 extending through opposite sides of post 166 along diameters. Post 166 has an upper end 169 extending above conveyor system 30 and attached to a joist 64 of system 30 (FIG. 5). The assembly also includes a series of precast sleeves, such as sleeve 200. Sleeve 200 includes half pieces 202 and 203 that are formed with V-shaped slots 205 and 204, respectively. Sleeve 200 provides support for post 166 by means of pin 210 which extends through opposing holes 165 and rests in slots 204 and 205. An upper collar 168 includes three pairs of brackets such as 170 and 171. Each pair of brackets supports a pin 174 that is moved by a hydraulic jack system including hydraulic jacks 176–178. Exemplary jack 176 includes a cylinder 180 and a piston 182 that can lift a substantial weight in a well-known manner. Jack 176 also includes at its lower end a bracket 184 that is drilled to receive a pin. Post 166 is surrounded by a lower collar 190 which includes a ring 192, and supports three pairs of brackets, such as 194 and 195, that are drilled so that a pin 198 holds bracket 184 of an associated hydraulic jack to the pair of brackets 194 and 195.

In order to use jackpost assembly 162, a pin 167 is installed through a pair of holes 165 in post 166 directly above upper collar 168. Hydraulic jacks 176–178 are operated so that their pistons extend upward slightly until pin 210 can be removed from post 166. The hydraulic jacks are then operated to move upper collar 168 and opst 166 to the elevated position shown in phantom lines in FIG. 6. Pin 210 may then be inserted through a pair of holes 165 in post 166 to support the post in slots 204 and 205. At this point, if desired, the jacks and lower collar 190 may be moved upward to accommodate an additional pair of precast sleeves that are placed on top of sleeve 200. The same technique is used in connection with each of the jackpost assemblies in order to raise conveyor system 30, thereby enabling an additional layer of concrete to be poured on the dam surface.

Figure 8:
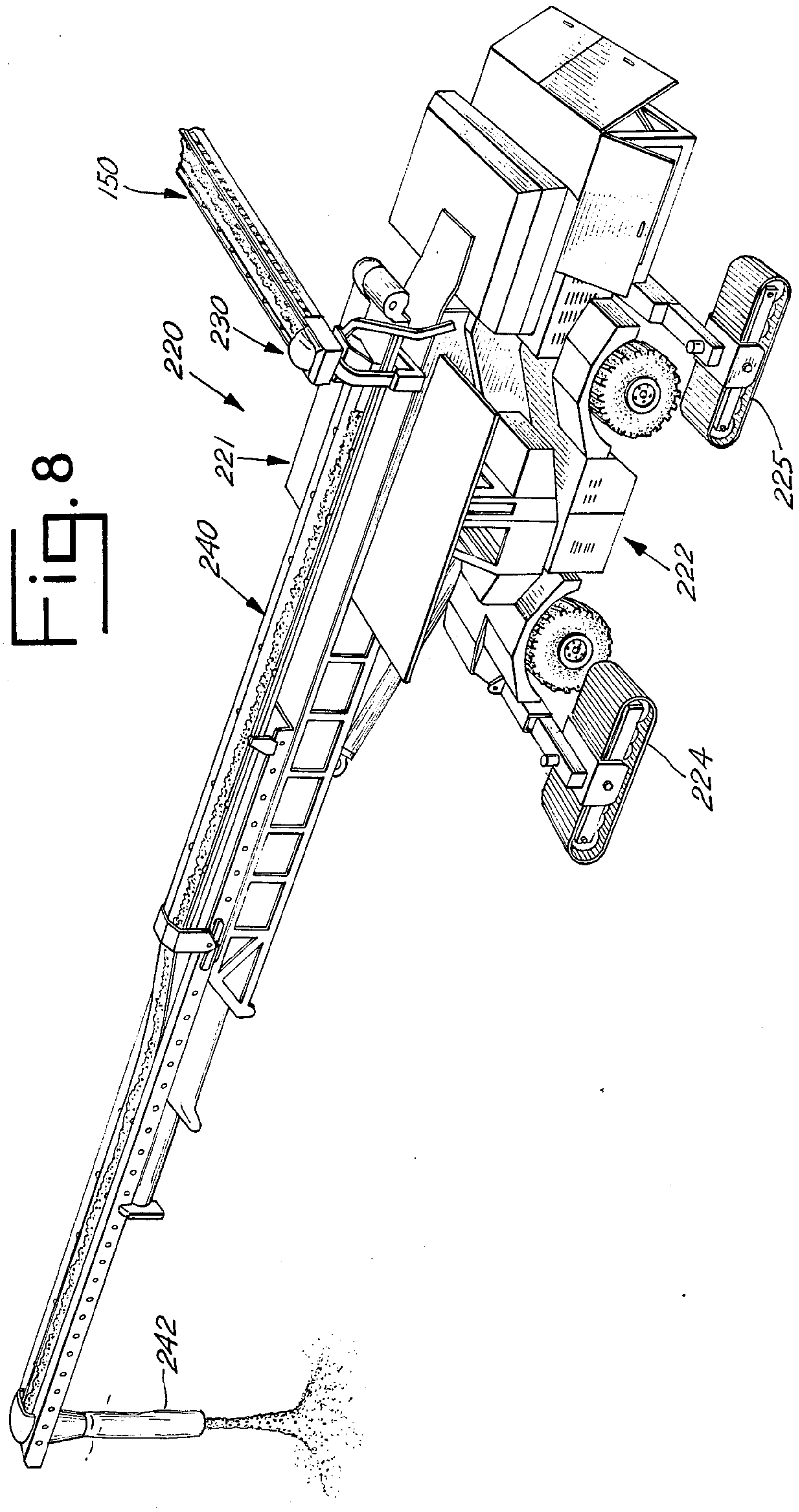
FIG. 8 is a perspective view of a mobile concrete placing unit used in connection with the system shown in FIG. 1.

Referring to FIG. 8, the mixed wet concrete being transported on link conveyor 150 is ultimately deposited by concrete spreading system 220. The system includes a pair of identical cranes 221 and 271 (FIG. 1). Since the cranes are identical, only crane 221 will be described in detail in connection with FIG. 8. Crane 221 includes a self-propelled vehicle 222 that is fitted with four tracks. One pair of tracks, 224 and 225, on the left side of the vehicle, are illustrated. A pair of identical tracks is located in the corresponding position on the right side of the vehicle. This is an important feature that enables the vehicle to move on the freshly poured concrete surface of the dam. The belts of the conveyor system are equipped with efficient scrappers so that no concrete residue comes off the belt to contaminate the surface on which the concrete is being placed. Such scrappers are shown in U.S. Pat. No. 3,795,308 (Oury-Mar. 5, 1974) and U.S. Pat. No. 3,414,116 (Oury-Dec. 3, 1968).

The concrete on link conveyor 150 is transmitted through a swivel transfer 230 to a telescoping boom conveyor 240. The boom conveyor may be of the type shown in U.S. Pat. No. 3,598,224 (Oury-Aug. 10, 1971), or U.S. Pat. No. 3,945,484 (Oury-Mar. 23, 1976). The free end of conveyor 240 is fitted with a tremie 242 that contains baffles shaped to deposit concrete in a segregation-free manner. This is an important feature that enables concrete containing six inch aggregate to be uniformly deposited on the surface of dam 6. Mobil cranes 221 and 271 provide great flexibility in concrete placement that also help prevent cold joints in the concrete.

Figure 9:
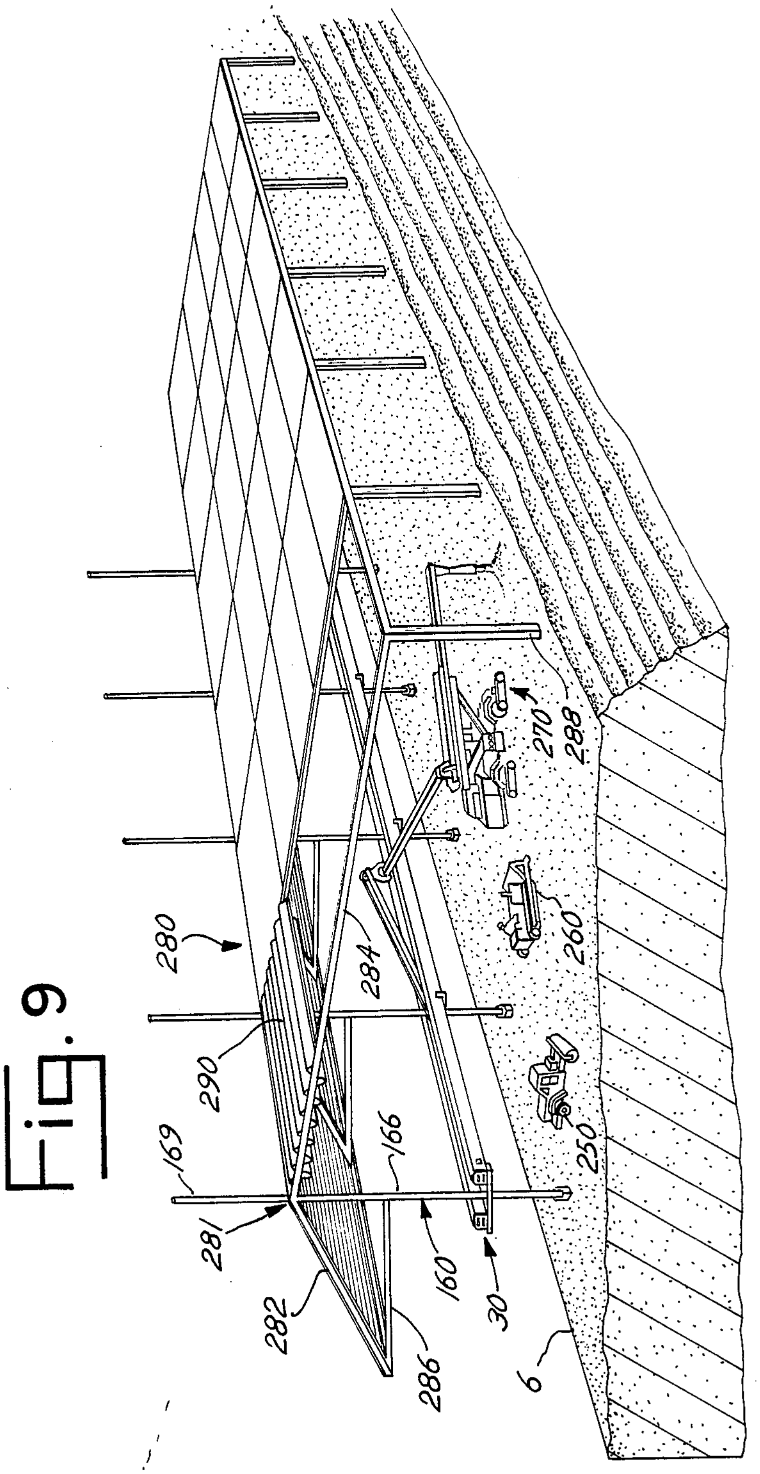
FIG. 9 is a perspective view of a preferred form of protection system used in connection with a second embodiment of the invention.

As shown in FIG. 9, a conventional compactor 250 and bulldozer 260 also may be used in order to uniformly spread wet concrete on the surface of dam 6.

A second embodiment of the invention will now be described in connection with FIGS. 1, 3 and 5–9. According to the second embodiment of the invention, stockpiling system 14 and a mixing system 130 are eliminated. The wet concrete is mixing in a conventional batch plant located at a site remote from the dam, and the wet concrete is transported by conveyor system 30 from the batch plant to traveling belt tripper conveyors 70 and 90. The tripper conveyors transfer the wet concrete to link conveyors 110 and 122 in a manner previously described. The link conveyors transport the wet concrete directly to concrete spreading system 220 as previously described in connection with FIG. 8.

Referring to FIG. 9, in order to preserve the wet concrete as it is being transported from the batch plant to the dam, the second embodiment of the invention employs a protection system 280 that includes a frame 281 erected along the entire length of conveyor system 30. As shown in FIG. 9, the frame includes upstream rafters 282 and downstream rafters 284. The rafters are supported by the upper end of the outer post 166 of support system 160. Outer post 166 is extended upward in this embodiment compared to the view shown in FIG. 5. A joist 286 is fastened between post system 160 and rafter 282 in order to provide additional strength and support for rafter 282. The outer end of rafter 284 is supported by a series of downstream posts 288. Frame 281 supports a series of flexible sheet panels 290 that are fitted into tracks in the joists. The panels are arranged so that they can be opened or closed in order to protect the freshly distributed concrete from the sun, rain and excessive heat. Preferably, panels 290 include a reflective upper surface that reflect most of the sun's rays away from the dam surface.

Referring to FIG. 5, protection system 280 also includes a series of covers 292 that fit into slots in the upper system of the side frames of conveyors 32 and 34. This is an important feature that enables cold air to be conducted between the covers and the upper surface of belts 38 and 48 in order to preserve the condition of the wet concrete as it is transported from the batch plant to the dam site.

Figure 10:
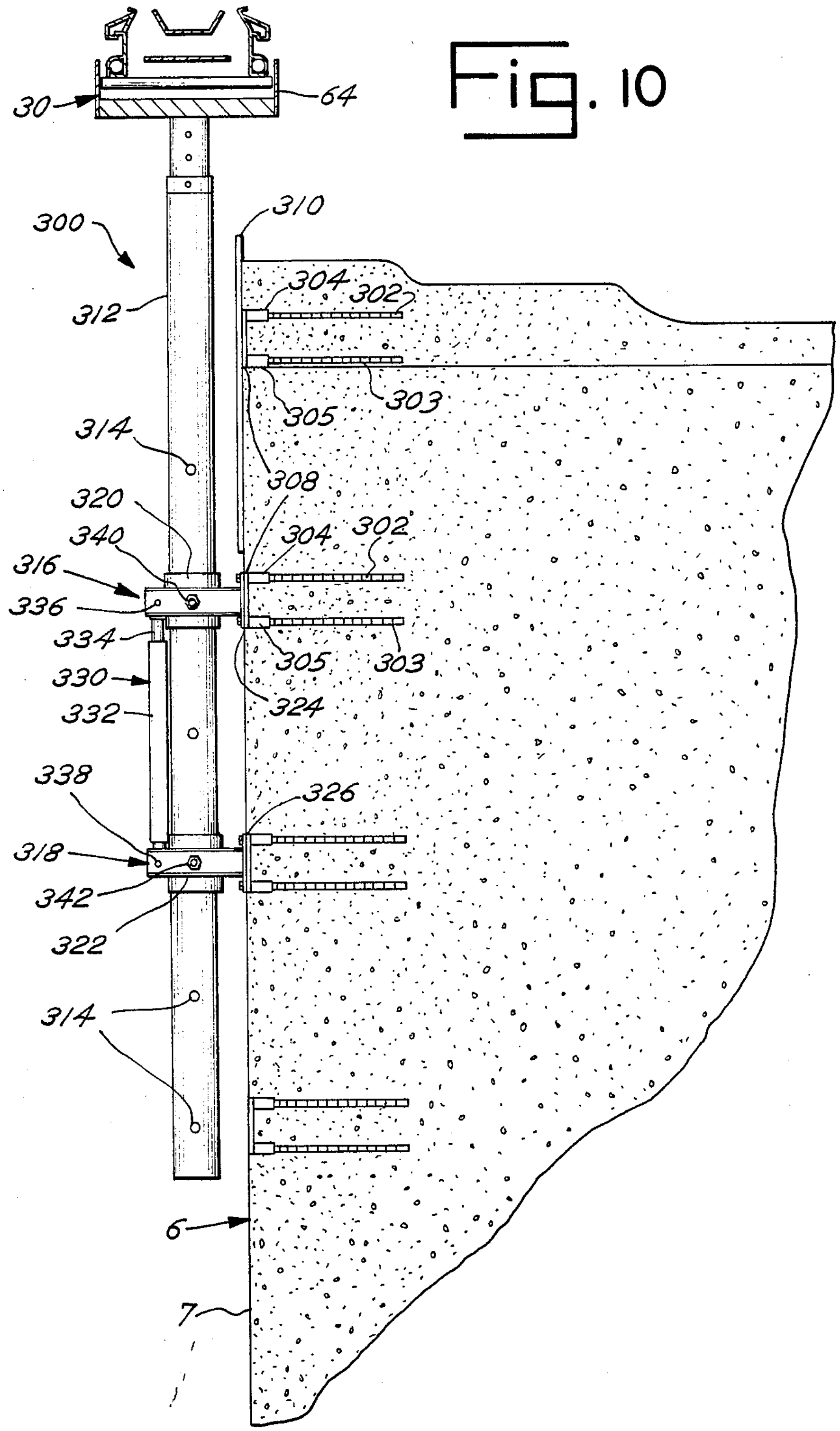
FIG. 10 is a side elevational view of an alternative form of support means.

FIG. 10 illustrates an alternative support system 300 that may be used in order to support conveyor system 30 along the upstream face 7 of dam 6. As the dam is poured, anchoring rods 302 and 303 are embedded in the freshly poured concrete. At the upstream face of the dam, the anchoring rods are attached to threaded tubes 304 and 305 that are held by a faceplate 308. All of the foregoing FIG. 10 apparatus is positioned by a conventional concrete form 310.

Support system 300 includes a hollow post 312 that is drilled with pairs of opposed holes 314 at equally spaced intervals. The system also includes an upper two-piece bracket 316 and a lower two-piece bracket 318 that fit around post 312. The brackets incorporate drilled collars 320 and 322 that include opposed hole pairs that will mate with holes 314 in post 312. The brackets are welded to faceplates 324 and 326 that co-mate with faceplates 308 and threaded tubes 304 and 305 held in the face of the dam. A hydraulic jack 330 having a cylinder 332 and a piston 334 is secured to the upper and lower brackets by means of pins 336 and 338, respectively. The brackets may be used to position post 312 by means of pins 340 and 342 that extend through the comating holes in collars 320 and 322 and post 312.

In order to use the system, the upper end of post 312 is rigidly attached to a joist 64 of mainframe 60 that supports conveyor system 30. In order to move the post upward as shown in FIG. 10, the bolts holding bracket 316 to faceplate 308 are removed, and pin 342 is removed from lower bracket 318. Hydraulic jack 330 is then operated so that its piston extends upward to a position essentially opposite the highest reinforcing rods located in the dam surface. The bolts are then used to join upper bracket 316 to the new threaded tubes adjacent the upper surface of the dam, and lower bracket 318 is moved upward to a position opposite the former location of upper bracket 316. Pin 342 is then reinstalled in the lower bracket in order to hold post 312 with respect to the lower bracket. At this point, jack 330 may be removed and used in a like manner on an adjacent bracket located along the length of conveyor system 30. By repeating the process along the length of the conveyor system, the conveyor may be raised as the dam surface rises.

By using the techniques taught in the specification, dam construction can proceed at a rate about six to thirteen times the rate normally achieved by pouring concrete from suspended buckets. The ability of the system to rapidly pour concrete precludes the formation of cold joints. In addition, the first embodiment of the invention enables large quantities of aggregate to be transported over long distances without the danger of premature settling or having concrete set up in the event of a conveyor breakdown. The conveyors and placing unit that handle the completely mixed concrete are relatively short and can be readily cleared in the event of a breakdown.

Those skilled in the art will recognize that the embodiments described above may be altered and modified without departing from the true spirit and scope of the invention as defined in the accompanying claims.

What is claimed is:

1. An apparatus for continuously mixing, transporting and placing large quantities of concrete in building a dam located against a lake and remote from a stockpile of sand and several sizes of aggregate comprising (a) a master belt conveyor running from said remote point to the dam site, (b) means for placing metered quantities of sand and several sizes of aggregate from said stockpile on said master belt conveyor, (c) a mobile rotary tube mixer disposed on said dam, said tube mixer having an inlet and outlet at opposite ends thereof, (d) a tripper belt conveyor between said master belt conveyor and said mixer for delivering aggregate and sand to said mixer, (e) a mobile cement trailer connected to said mixer for movement therewith, (f) means for continuously conveying cement in metered amounts from said trailer to the inlet of said mixer in proportion to the weight of aggregate and sand being charged into the mixer, (g) means for continuously pumping water in metered amounts from said lake to the inlet of said mixer, (h) a placing machine on said dam, (i) a belt conveyor at the outlet of said mixer for transporting concrete to said placing machine, and (j) precast concrete sleeves disposed in previously-placed concrete in the surface of the dam, said master conveyor being mounted on jack posts within said precast concrete sleeves, whereby said master conveyor is raised as the height of the dam increases.

2. The apparatus of claim 1 in which said concrete sleeve has an upper end, each said jack post has pairs of holes spaced along its length and a pin extending through the holes, said pin resting on the upper end of said concrete sleeve to support the post.

3. The apparatus of claim 2 which includes a plurality of jacks having lower and upper ends the lower ends being supported by said concrete sleeve, a collar surrounding and connected to said post above said sleeve, and upper ends of said jacks being connected to said collar to lift the post from said sleeve.

4. An apparatus for continuously mixing, transporting and placing large quantities of concrete in building a dam located adjacent a lake and remote from a stockpile of sand and several sizes of aggregate comprising (a) a master belt conveyor running from said remote point to the dam site, (b) means for placing metered quantities of sand and several sizes of aggregate from said stockpile on said master belt conveyor, (c) a mobile rotary tube mixer disposed on said dam, said tube mixer having an inlet and outlet at opposite ends thereof, (d) a tripper belt conveyor between said master belt conveyor and said mixer for delivering aggregate and sand to said mixer, (e) a mobile cement trailer connected to said mixer for movement therewith, (f) means for continuously conveying cement in metered amounts from said trailer to the inlet of said mixer in proportion to the weight of aggregate and sand being charged into the mixer, (g) means for continuously pumping water in metered amounts from said lake to the inlet of said mixer, (h) a placing machine on said dam, (i) a belt conveyor at the outlet of said mixer for transporting concrete to said placing machine, and (j) jack posts connected to brackets embedded in and projecting from the side wall of said dam, said master conveyor being mounted on said jack posts, whereby said master conveyor is raised as the height of the dam increases.

* * * * *